US006686795B2

(12) United States Patent
Hisano

(10) Patent No.: US 6,686,795 B2
(45) Date of Patent: Feb. 3, 2004

(54) COMPACT SELF-BIASING REFERENCE CURRENT GENERATOR

(75) Inventor: Shinichi Hisano, Colorado Springs, CO (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 09/916,765

(22) Filed: Jul. 27, 2001

(65) Prior Publication Data

US 2003/0020536 A1 Jan. 30, 2003

(51) Int. Cl.[7] .................................................. G05F 3/02
(52) U.S. Cl. ........................ 327/538; 327/540; 323/315

(58) Field of Search ......................... 327/530, 538–545; 323/315, 316

(56) References Cited

U.S. PATENT DOCUMENTS 5,087,891 A * 2/1992 Cytera ........................ 330/288

* cited by examiner

*Primary Examiner*—Kenneth B. Wells
(74) *Attorney, Agent, or Firm*—William E. Hein

(57) ABSTRACT

A self-biasing reference current generator that is compact and capable of implementation in a bipolar semiconductor process or a CMOS process and that generates a reference current output as well as the bias currents required by the reference current generator itself

2 Claims, 3 Drawing Sheets

COMPACT SELF-BIASING REFERENCE CURRENT GENERATOR

BACKGROUND AND SUMMARY OF THE INVENTION

This invention relates generally to monolithic reference current generators and, more specifically, to a very compact self-biasing current generator that can be implemented in a bipolar semiconductor process or in a complementary metal oxide semiconductor (CMOS) process.

In the field of analog integrated circuit (IC) design, it is very common to provide a reference current that is proportional to a reference voltage, the reference current being provided though a current mirror.

FIG. 1 shows a typical prior art circuit for providing a reference current Iout at the output of a current mirror. An operational amplifier forces the junction between resistor R1 and the source terminal of device M1 to a reference voltage Vref, thereby generating a current I that is equal to Vref/R1 through components M1, M2, and R1. While this circuit appears simple, it requires the operational amplifier along with its bias circuit. A reference current generator such as this is often used to provide stable current sources to critical analog circuits inside a chip. If the current generator requires another bias circuit elsewhere in the chip for its own biasing, it increases the size, power requirements, and complexity of the entire current reference circuit. The biasing circuit for the operational amplifier of FIG. 1 will most likely be very simple and inaccurate, causing undesirable errors in the offset, offset drift, and other parameters of the operational amplifier.

It would therefore be advantageous to provide a self-biasing reference current generator that is compact and capable of implementation in a bipolar semiconductor process or a CMOS process and that generates a reference current output as well as the bias currents required by the rest of the circuit.

DETAILED DESCRIPTION OF THE INVENTION

Figure 2:
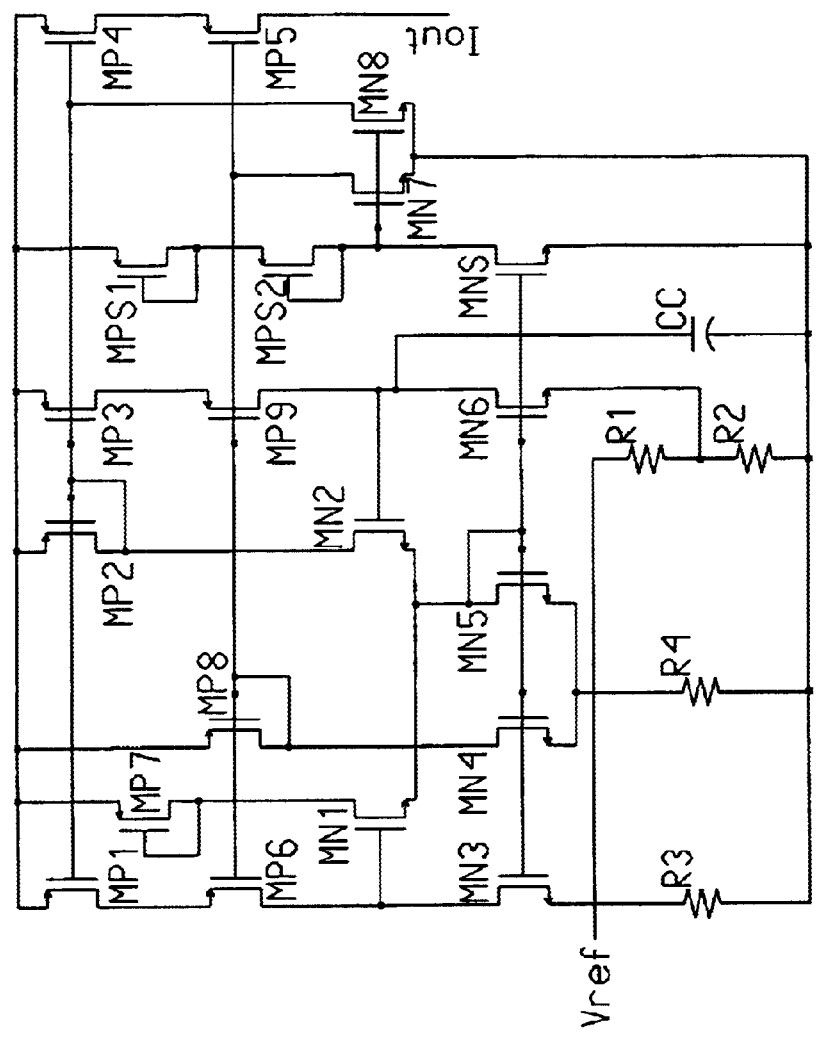
FIG. 2 is a circuit diagram of a reference current generator in accordance with a first embodiment of the present invention.
Figure 1:
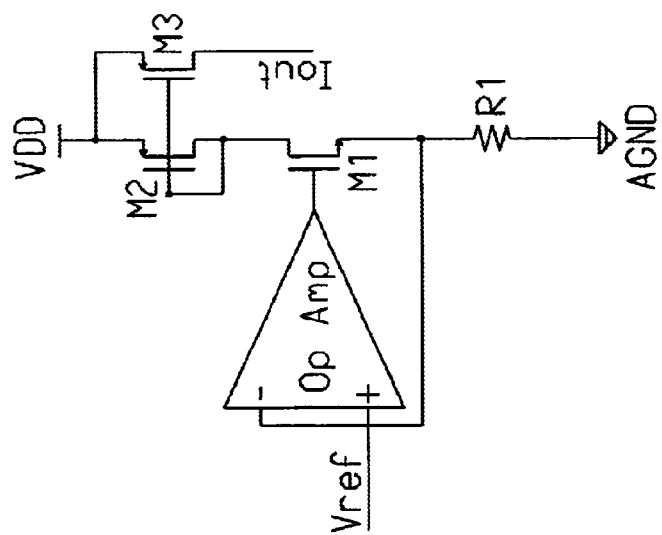
FIG. 1 is a circuit diagram illustrating a typical prior art reference current generator.
Figure 3:
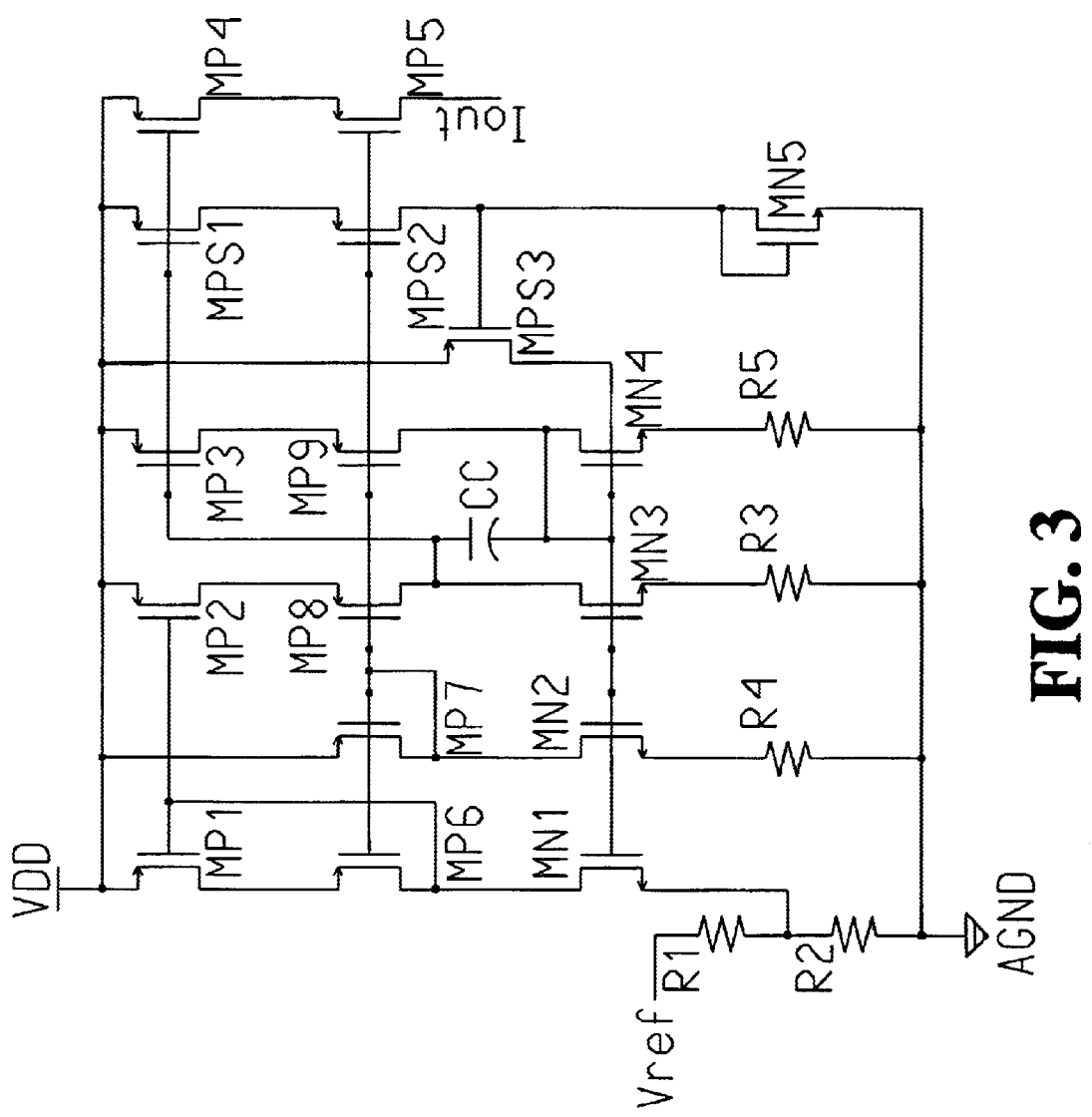
FIG. 3 is a circuit diagram of a reference current generator in accordance with a second embodiment of the present invention.
Figure 4B:
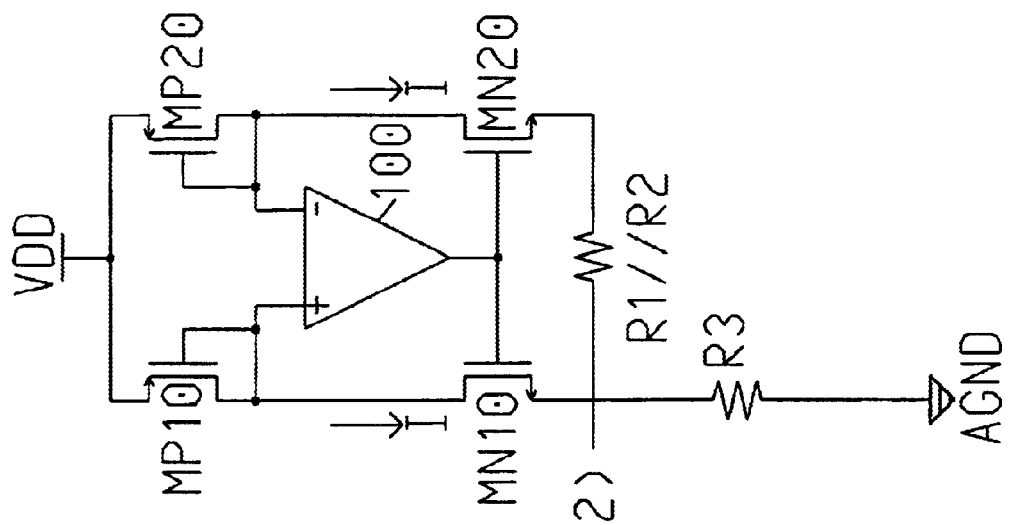
FIG. 4B is an equivalent circuit diagram of the circuit of FIG. 4A.
Figure 4A:
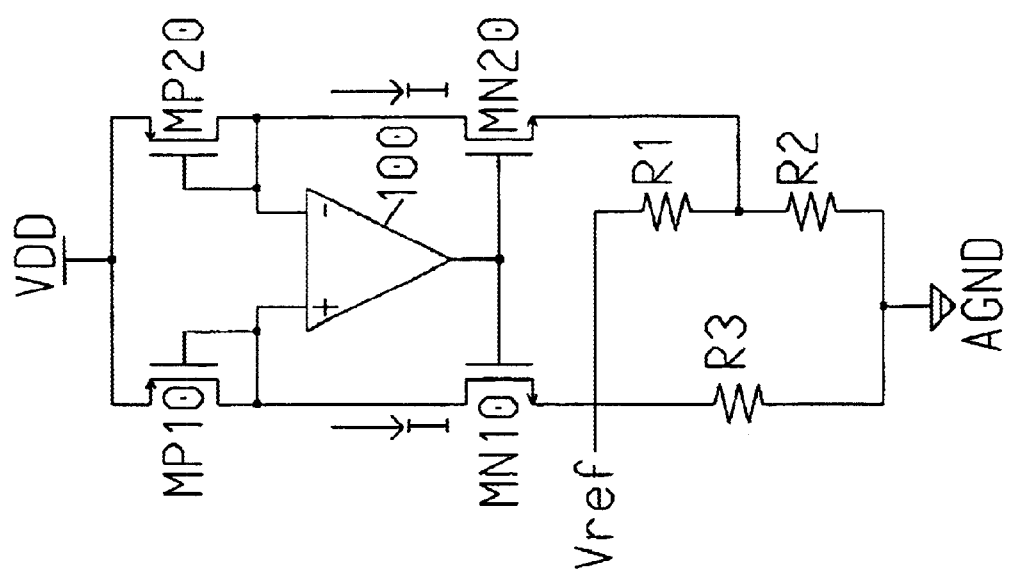
FIG. 4A is a circuit diagram illustrative of the principle by which the reference current generators of FIGS. 2 and 3 operate.

Referring generally to FIGS. 2 and 3, there are shown detailed circuit diagrams of alternative embodiments of a reference current generator in accordance with the present invention. Both of these circuits operate by the principles illustrated in the circuit diagrams of FIGS. 4A and 4B, which are described in detail hereinbelow. Referring now to FIG. 4A and its equivalent circuit of FIG. B, it is assumed that device pairs MN10 and MN20 and MP10 and MP20 are matched pairs with the same W/L ratio. It is also assumed that at the input voltage reference has a negligible source impedance. The circuits are configured such that the current through devices MN10 and MP10 is equal to the current through devices MN20 and MP20. The operational amplifier 100 of FIGS. 4A and 4B drives the common gate of MN10 and MN20 such that the voltage drops across diode connected PMOSFETs MP10 and MP20, are equal, and thereby forces this condition. The combination of voltage Vref, resistor R1, and resistor R2 is replaced with a voltage source having a value equal to Vref{R2/(R1R2)} and having an output impedance expressed by R1/R2(=R1R2/). Devices MN10 and MN20 operate under the same bias condition, making their gate to source voltages (Vgs) identical. Since MN10 and MN20 share the common gate connection, voltage at their source nodes are the same. Hence, $$R3 \cdot I = \frac{Vref \cdot R2}{R1 + R2} + \frac{R1 \cdot R2}{R1 + R2} \cdot I \quad (1)$$

Solving equation (1) for I yields $$I = \frac{\frac{R2}{R1 + R2}}{R3 - \frac{R1 \cdot R2}{R1 + R2}} \cdot Vref \quad (2)$$

$$= \frac{Vref}{R3 \cdot \left(1 + \frac{R1}{R2}\right) - R1} \quad (3)$$

As shown by equation (3), this circuit creates a reference current I which is proportional to the reference voltage Vref. The transimpedance is give by the following expression:

$$R3 \cdot \left(1 + \frac{R1}{R2}\right) - R1$$

It is clear from equation (2) that the following condition must be met:

$$R3 > \frac{R1 \cdot R2}{R1 + R2} \quad (4)$$

This condition dictates the polarity of the operational amplifier connection.

Referring now to the first embodiment of the present invention illustrated in FIG. 2, the differential amplifier formed by the common gate input stage MN3, MN6, followed by the common source stage MN1, MN2, and the loads MP7 and MP2, forces the gate voltage of current source devices MP1 and MP3 so that the same amount of current flows through devices MN3 and MN6. This current is mirrored by another current source device MP4 to provide the output current, Iout. Device MP5, MP6, and MP9 serve as cascode devices for the current source devices MP4, MP1, and MP3, respectively, enhancing the output impedance of the current sources.

Devices MN5 and R4 provide a proper bias current for the differential pair MN1 and MN2, by establishing a proper voltage at the common source node of the differential pair. MN5 and R4 also provide a proper bias voltage for the common gate connection for MN3 and MN6. Current through MN4 is used to establish the common gate bias voltage for the cascode devices MP5, MP6, and MP9, via MP8.

Self-biasing circuits in general require a start-up circuit to keep the circuit from going into a zero current state. This start-up function is achieved by devices MPS1, MPS2, MNS, MN7, and MN8 of FIG. 2. If devices MN3, MN4, MN5, and MN6 conduct zero current, MNS also is in zero current state because all of these NMOSFETs share a common gate node. Under this condition, the voltage drop across diode connected PMOSFETs, MPS1 and MPS2, is close to zero, turning on both MN7 and MN8 by driving the common gate node of MN7 and MN8 high toward the power supply voltage. Drain currents through MN7 and MN8 will turn on MP8 and MP2, which in turn will turn on all remaining PMOSFETs in FIG. 2. Currents through MP1, MP6, MP3, and MP9 drive gates of all NMOSFETs, completing the start-up function. The device sizes of MPS1 and MPS2 are chosen such that the voltage drop across them is large enough to turn off MN7 and MN8 once the reference current generator reaches it equilibrium.

The second embodiment of the present invention illustrated in FIG. 3 is suited for power supply voltages as low as 1.8 volts or less. Devices MN1 an MN3 may be regarded as a common gate differential amplifier with an active load formed by MP1 and MP2. Device MP8 serves as a cascode device to increase the impedance of the active load. Device MP6 guarantees that MP1 and MP2 operate under the same bias condition. This stage is followed by a common source amplifier form by devices MP3 and MP9 with its load formed by MN4 and resistor R5. This common source amplifier sets up the common gate node for devices MN1, MN2, and MN3 such hat the currents through devices MN1 and MN3 are equal in value. Devices MN2 and MP7 along with resistor R4 establish a proper bias voltage for the common gate connection for MP6, MP8, MP9, MPS2, and MP5. Devices MPS 1, MPS2, MPS3, and MN form a start-up circuit. A current source formed by MP4 and MP5 provides the output current Iout.

The self-biasing reference current generator circuits of FIGS. 2 and 3 may be conventionally implemented in either a bipolar semiconductor process or a CMOS process.

I claim:

1. A self-biasing reference current generator comprising:

first and second current source devices for generating first and second currents;

a differential amplifier coupled to the first and second current source devices for forcing the first and second currents to be equal;

a third current source device for mirroring the first and second currents and to provide an output current;

a cascode device coupled to the first, second, and third current source devices for increasing the output impedance of the first, second, and third current source devices; and a bias circuit, including a start-up circuit, coupled to the differential amplifier for providing a bias current therefor.

2. A self-biasing reference current generator comprising:

a common gate differential amplifier;

an active load coupled to the common gate differential amplifier;

a cascode device coupled to the active load for increasing the impedance thereof;

a common source amplifier coupled to the common gate differential amplifier for insuring the equality of currents flowing through the common gate differential amplifier;

a load circuit coupled to the common source amplifier;

a bias circuit, including a start-up circuit, coupled to the common gate differential amplifier, for providing a bias voltage therefor, and a current source circuit coupled to the common source amplifier for providing an output current.

* * * * *